US 11,325,526 B2

(12) United States Patent
Kusumoto et al.

(10) Patent No.: US 11,325,526 B2
(45) Date of Patent: May 10, 2022

(54) HEADLAMP CONTROL DEVICE

(71) Applicant: Mazda Motor Corporation, Hiroshima (JP)

(72) Inventors: Shimpei Kusumoto, Aki-gun (JP); Kumiko Takenouchi, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/178,536

(22) Filed: Feb. 18, 2021

(65) Prior Publication Data

US 2021/0291723 A1 Sep. 23, 2021

(30) Foreign Application Priority Data

Mar. 19, 2020 (JP) .............................. JP2020-049124

(51) Int. Cl.
*B60Q 1/14* (2006.01)
*F21S 41/65* (2018.01)
(Continued)

(52) U.S. Cl.
CPC ........... *B60Q 1/143* (2013.01); *B60Q 1/1423* (2013.01); *F21S 41/141* (2018.01); *F21S 41/65* (2018.01); *H05B 45/10* (2020.01); *H05B 47/125* (2020.01); *B60Q 2300/054* (2013.01); *B60Q 2300/134* (2013.01); *B60Q 2300/314* (2013.01); *B60Q 2300/33* (2013.01); *F21W 2102/13* (2018.01); *F21W 2102/20* (2018.01); *F21Y 2115/10* (2016.08)

(58) Field of Classification Search
CPC .................. B60Q 1/143; B60Q 1/1423; B60Q 2300/134; B60Q 2300/31; B60Q 2300/312; B60Q 2300/314; F21S 41/65; F21W 2102/20
See application file for complete search history.

(56) References Cited

U.S. PATENT DOCUMENTS 5,837,994 A * 11/1998 Stam ...................... B60Q 1/085
250/208.1
9,580,005 B2 * 2/2017 Foltin .................... B60Q 1/143
(Continued)

FOREIGN PATENT DOCUMENTS

JP 2000238594 A 9/2000

*Primary Examiner* — William N Harris
(74) *Attorney, Agent, or Firm* — Alleman Hall Creasman & Tuttle LLP

(57) ABSTRACT

A headlamp control device configured to control a headlamp which illuminates forward of a vehicle, is provided. The device includes a visibility detector configured to detect visibility of a road state forward of the vehicle, and a headlamp controlling module configured to control brightness of the headlamp. The headlamp controlling module is able to adjust light emitted from the headlamp so that a brightness gradient that is a difference of brightness of a part distant from the vehicle and brightness of a part closer to the vehicle is changed. When a deterioration in the visibility is detected, the headlamp controlling module executes a brightness adjusting control in which the brightness gradient is increased by making the brightness of the part closer to the vehicle higher than the brightness of the part distant from the vehicle, as compared with the brightness gradient when the deterioration in the visibility is not detected.

20 Claims, 9 Drawing Sheets

(51) Int. Cl.
*F21S 41/141* (2018.01)
*H05B 45/10* (2020.01)
*H05B 47/125* (2020.01)
*F21Y 115/10* (2016.01)
*F21W 102/13* (2018.01)
*F21W 102/20* (2018.01)

(56) References Cited

U.S. PATENT DOCUMENTS

| | | | |
|---|---|---|---|
| 10,766,403 B1* | 9/2020 | Minjeur | G06K 9/00825 |
| 2014/0125227 A1* | 5/2014 | Ehlgen | B60Q 1/0023 |
| | | | 315/82 |
| 2017/0036592 A1* | 2/2017 | Hoffmann | B60Q 1/143 |

* cited by examiner

HEADLAMP CONTROL DEVICE

TECHNICAL FIELD

The technology disclosed herein belongs to a technical field related to a headlamp control device.

BACKGROUND OF THE DISCLOSURE

Conventionally, in an environment where the visibility of a vehicle driver worsens such as during rain at night, a technology which enables the driver to recognize a road state has been proposed.

For example, JP2000-238594A discloses a driving support device for displaying an image captured by a camera which is installed in a vehicle and fetches information on an environment outside the vehicle on a display of a car navigation system or a head mounted display, when it determines that it is difficult to visually recognize a vehicle position on the road.

Meanwhile, according to the present inventors' diligent research, it has been discovered that one cause of the visibility of the road state forward of the vehicle deteriorating during rain at night is that the pupils of the driver contract and become smaller. That is, at night, when environment light, such as light from headlamps of an oncoming vehicle, enters into the driver's pupils, the driver's pupils become smaller. Particularly, during rain, since the environment light reflects on a water surface and an amount of environment light entering into the driver's pupils increases, the driver's pupils tend to become even smaller. When the pupils become smaller, since the reflected light from the road becomes less likely to enter into the pupils, the driver's ability to visually recognize the road state worsens, and therefore, the visibility of the road state forward of the vehicle deteriorates.

If the image indicative of the vehicle external environment is displayed on the display of the car navigation system like the technology disclosed in JP2000-238594A, it becomes easier to confirm the road state. However, since the driver's pupils stay small, a large improvement in the driver's visual recognition ability cannot be expected. Particularly, the image captured by the camera will not improve the ability to recognize the road state distant from the vehicle greatly.

SUMMARY OF THE DISCLOSURE

The technology disclosed herein improves a visual recognition ability of a driver in an environment where the visibility of the road state deteriorates, to suppress that the visibility of the road state forward of the vehicle deteriorates.

According to one aspect of the present disclosure, a headlamp control device configured to control a headlamp which illuminates forward of a vehicle is provided. The device includes a camera configured to obtain an image, and a processor. The processor is configured to execute a traveling scene determining module to detect visibility of a road state forward of the vehicle from the image, and a headlamp controlling module to control the brightness of the headlamp. The headlamp controlling module is configured to adjust light emitted from the headlamp so that a brightness gradient that is a difference of the brightness of a part distant from the vehicle and the brightness of a part closer to the vehicle is changed. When a deterioration in the visibility is detected by the traveling scene determining module, the headlamp controlling module performs a brightness adjusting control in which the brightness gradient is increased by making the brightness of the part closer to the vehicle higher than the brightness of the part distant from the vehicle, as compared with the brightness gradient when the deterioration in the visibility is not detected.

Thus, according to the present inventors' diligent research, it has been discovered that the pupils of a driver are made wider when the brightness gradient of the light of the headlamp changes so that the brightness of the part closer to the vehicle becomes higher than the brightness of the part distant from the vehicle. Thus, in this configuration, when the deterioration in the visibility is detected, by adjusting the brightness gradient of the light of the headlamp, the driver's pupils can be made wider. As a result, the driver's visual recognition ability improves, and deterioration in the visibility of a road state forward of the vehicle can be suppressed.

The headlamp controlling module may increase the brightness gradient in the brightness adjusting control by increasing the brightness of the part closer to the vehicle while the brightness of the part distant from the vehicle is maintained.

According to this configuration, the location distant from the vehicle can be illuminated with sufficient brightness, while widening the driver's pupils by increasing the brightness gradient. As a result, the driver's visual recognition ability is improved more effectively.

The traveling scene determining module may be further configured to detect that the vehicle travels in an intersection. When the traveling scene determining module detects that the vehicle turns to the right or turns to the left at the intersection, the headlamp controlling module may not perform the brightness adjusting control even when the deterioration in the visibility is detected.

That is, when the vehicle turns to the right or turns to the left at the intersection, the driver needs to carefully watch the road state near the vehicle rather than the road state distant from the vehicle. Thus, it is not necessary to widen the driver's pupils by the brightness adjusting control. Therefore, according to this configuration, the driver's visual recognition ability is improved further more effectively.

The traveling scene determining module may be further configured to detect an amount of environment light that is light around the vehicle. When the environment light above a given amount is detected by, the headlamp controlling module may not perform the brightness adjusting control even when the deterioration in the visibility is detected.

That is, when there is a large amount of environment light around the vehicle, even if the brightness gradient of the light of the headlamp is increased, this brightness gradient is canceled by the environment light, and it becomes difficult to widen the driver's pupils. Thus, when there is much environment light, the brightness adjusting control is not performed, which reduces the power consumption of the vehicle.

The headlamp may have a plurality of light-emitting diode (LED) light sources. The headlamp controlling module may increase the brightness gradient in the brightness adjusting control, by adjusting the brightness of each of the plurality of LED light sources.

According to this configuration, the brightness gradient can be adjusted easily, and thus, the driver's visual recognition ability is improved easily.

The headlamp may include a low-beam unit and a high-beam unit. The low-beam unit may form light directed to a lower location forward of the vehicle than the high-beam unit. The part distant from the vehicle may be a location where the light of the high-beam unit is directed, and the part closer to the vehicle may be a location where the light of the low-beam unit is directed.

The headlamp controlling module may adjust the brightness gradient of the headlamp by making the brightness of the plurality of LED light sources of the low-beam unit configured to illuminate the part closer to the vehicle higher than the brightness of the plurality of LED light sources of the high-beam unit configured to illuminate the part distant from the vehicle.

DETAILED DESCRIPTION OF THE DISCLOSURE

Hereinafter, exemplary embodiments will be described in detail with reference to the accompanying drawings.

Embodiment 1

Figure 1:
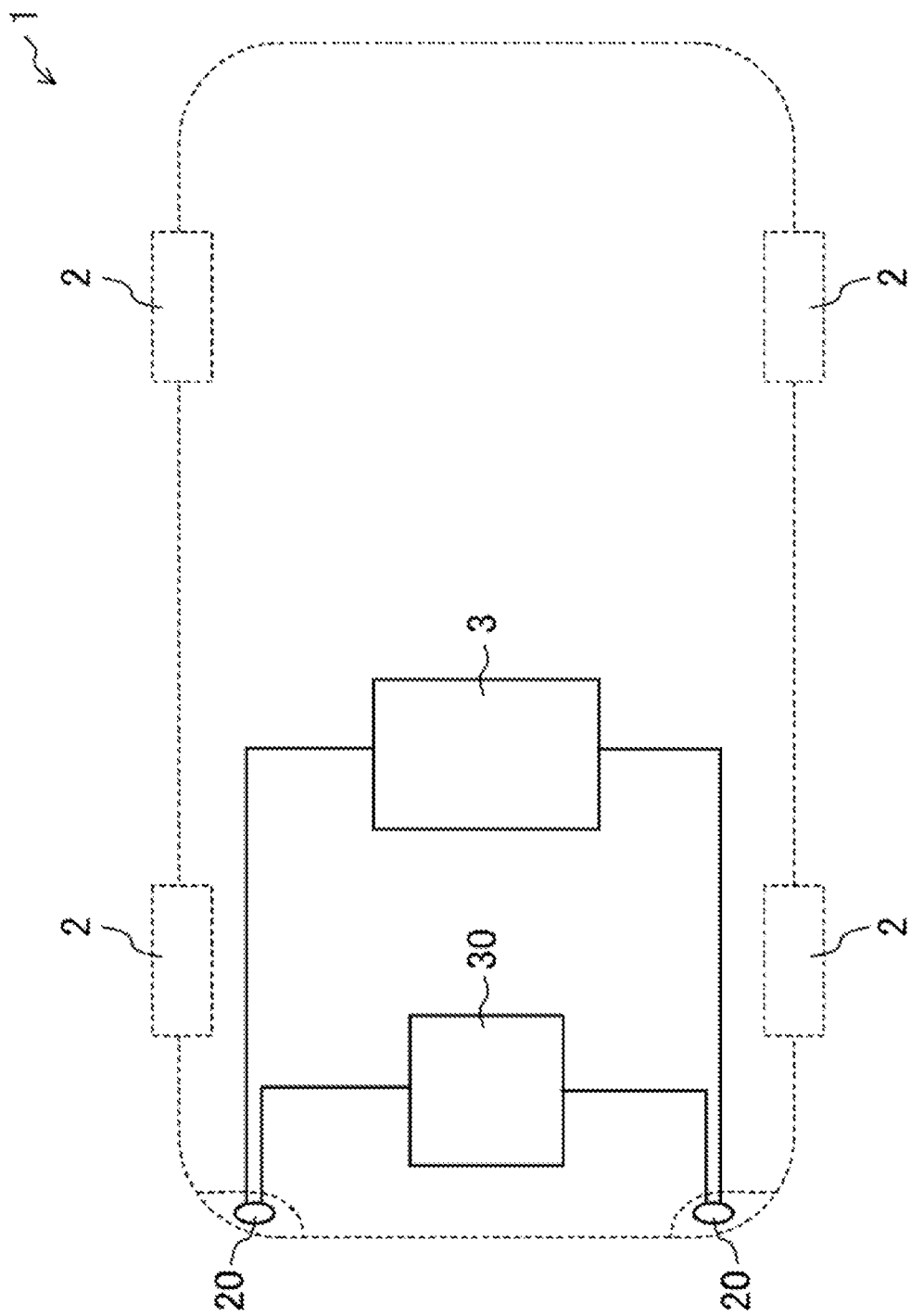
FIG. 1 is a schematic view illustrating a vehicle provided with headlamps controlled by a control device according to exemplary Embodiment 1.

FIG. 1 illustrates a vehicle 1 having a pair of headlamps 20 controlled by a control device according to Embodiment 1 (a body-system ECU 30 described later). The vehicle 1 is a four-wheel automobile in which two wheels (here, front wheels) among four wheels 2 located symmetrically in the left-and-right direction are driven by a drive unit (not illustrated). Therefore, the vehicle 1 moves (travels). In the following description, front, rear, left, right, up, and down of the vehicle 1 are simply referred to as front, rear, left, right, up, and down, respectively.

The pair of headlamps 20 are provided at the left and the right in a front part of the vehicle 1, and illuminate the road ahead of the vehicle 1. Although detailed illustration is omitted, each headlamp 20 is disposed so as to continue to a front fender of the vehicle 1. The headlamp 20 is electrically connected with a battery 3. The headlamp 20 is turned on when electric power is supplied from the battery 3.

Figure 2:
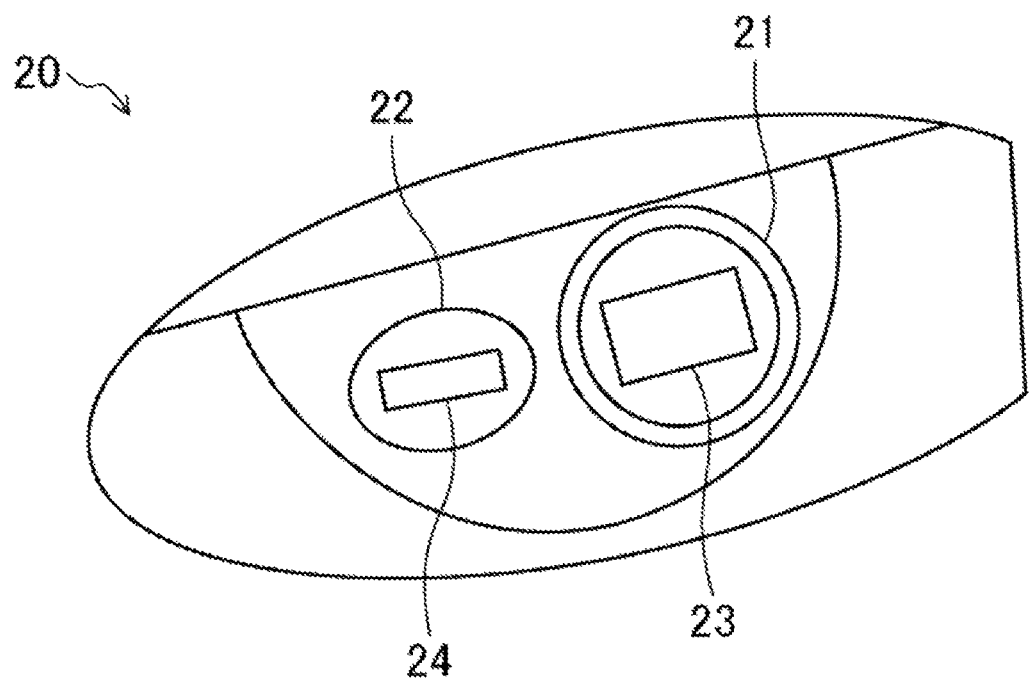
FIG. 2 is a schematic view illustrating a configuration of the headlamp.

As illustrated in FIG. 2, each headlamp 20 is provided with a low-beam unit 21 and a high-beam unit 22. The low-beam unit 21 emits a low beam forward of the vehicle, but slightly below. The low beam forms a part of the light emitted from the headlamp 20, closer to the vehicle. The high-beam unit 22 emits a high beam which is directed to forward of the vehicle substantially in the horizontal direction. The high beam forms a part of the light emitted from the headlamp 20, distant from the vehicle.

Figure 3:
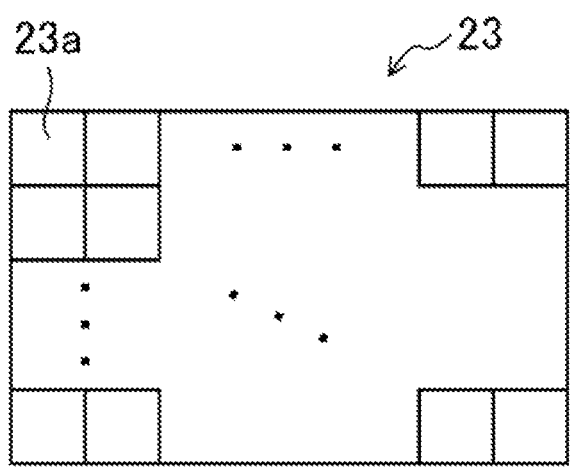
FIG. 3 is a schematic view illustrating a light-emitting diode (LED) layout of a low-beam unit.

The low-beam unit 21 includes a light-emitting diode (LED) array 23 comprised of a plurality of LED light sources 23a which emit the low beam, and a reflector. As illustrated in FIG. 3, the LED array 23 is formed so that a plurality of LED light sources 23a are lined up in a row in the up-and-down direction, and a plurality of rows of LED light sources 23a are disposed in a transverse direction (vehicle width direction). Each LED light source 23a is configured so that the brightness is independently adjustable. Note that the number of rows of LED light sources 23a is not limited in particular. Moreover, as long as there are two or more LED light sources 23a, the number of LED light sources 23a in each row is not limited in particular. In particular, the number of LED light sources 23a may differ in different rows.

The high-beam unit 22 has an LED array 24 comprised of a plurality of LED light sources, similarly to the low-beam unit 21. The layout of the plurality of LED light sources in the LED array 24 may be or may not be the same as the layout of the LED light sources 23a in the low-beam unit 21.

Each headlamp 20 is controlled by the body-system ECU (Electronic Control Unit) 30 (hereinafter, simply referred to as the "ECU 30"). The ECU 30 is computer hardware which is comprised of a processor 33 and memory 34 storing a plurality of modules as software. The processor 33 executes the plurality of modules to perform their respective functions. The ECU 30 executes a control of body-system devices, such as locking mechanisms of doors and power window devices, in addition to the control of the headlamp 20.

Figure 4:
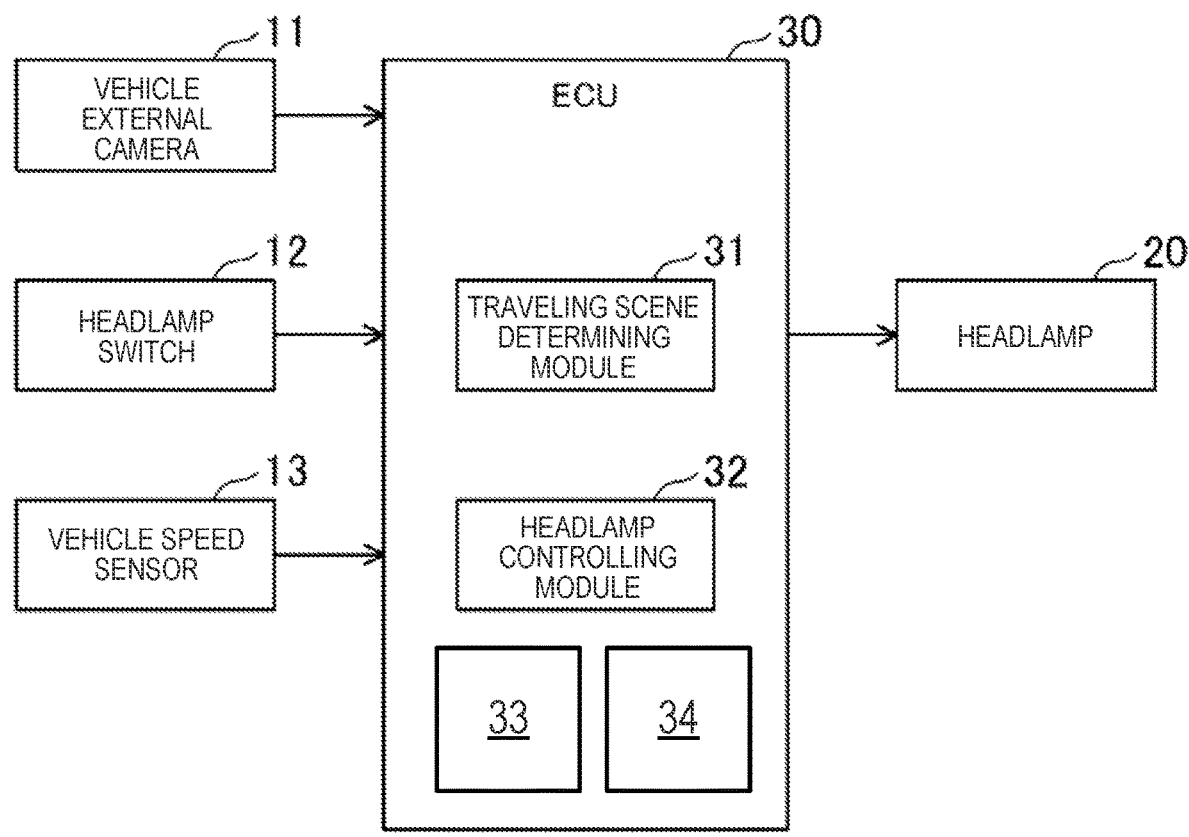
FIG. 4 is a block diagram illustrating a configuration of an electronic control unit (ECU).

As illustrated in FIG. 4, the ECU 30 generates a control signal to the headlamp 20 based on information inputted from a plurality of sensors. The plurality of sensors include a plurality of vehicle external cameras 11 which are provided to a body of the vehicle 1 and image an environment outside the vehicle, a headlamp switch 12 which receives a turn-on request of the headlamp 20 from a vehicle driver, and a vehicle speed sensor 13 which detects a traveling speed of the vehicle 1.

Each vehicle external camera 11 is disposed so as to image 360° horizontally around of the vehicle 1. The ECU 30 determines a traveling scene of the vehicle 1 based on the image captured by each vehicle external camera 11. The vehicle external camera 11 is a part of a visibility detector, a traveling scene detector, and an environment light detector.

The headlamp switch 12 is provided to, for example, a blinker lever. When the headlamp switch 12 is turned on, the headlamp 20 is activated by a headlamp controlling module 32 (described later) and illuminates forward of the vehicle 1.

The ECU 30 has a traveling scene determining module 31 which determines a traveling scene of the vehicle 1 based on information indicative of the vehicle external environment captured by the vehicle external camera 11. The traveling scene determining module 31 determines whether the vehicle 1 is currently traveling, based on the vehicle speed detected by the vehicle speed sensor 13. The traveling scene determining module 31 identifies, based on the image captured by the vehicle external camera 11, the time when the vehicle 1 travels (daytime or nighttime), a traveling position (straight way, intersection, urban area, or suburb), weather (sunny, rainy, or snowy), a road condition (wet road or snow road), and a surrounding environment (existence of environment light, such as light from stores and streetlights). Therefore, the traveling scene determining module 31 can detect the visibility forward of the vehicle, the vehicle traveling through an intersection, and the environment light around the vehicle based on the image captured by the vehicle external camera 11. That is, the traveling scene determining module 31 constitutes a part of the visibility detector, the traveling scene detector, and the environment light detector. The traveling scene determining module 31 constitutes a part of a module provided to the memory. Note that the traveling scene determining module 31 may determine the weather, for example, based on whether or not windshield wipers (not illustrated) are operating.

The traveling scene determining module 31 determines whether the visibility of the road state forward of the vehicle has deteriorated based on the identified traveling scene. For example, when the vehicle 1 travels on a wet road surface at night, since the environment light around the vehicle 1 reflects on the road surface and lines (e.g., centerline) on the road becomes difficult to be seen, the visibility of the road state forward of the vehicle deteriorates. Further, when the vehicle 1 enters into a tunnel at daytime, since the field of view becomes dark suddenly, the driver's visual recognition ability of the road state forward of the vehicle worsens. When the traveling scene as described above is identified, the traveling scene determining module 31 determines that the visibility of the road state forward of the vehicle has deteriorated. The traveling scene based on which the traveling scene determining module 31 determines the visibility of the road state forward of the vehicle deteriorates may be set in a table in advance. Note that the term "road state" as used herein means the locations of white lines and yellow lines, and the existence of obstacles on the road.

The traveling scene determining module 31 outputs information related to the identified traveling scene and information related to the deterioration in the visibility of the road state forward of the vehicle to the headlamp controlling module 32 (described below).

The ECU 30 has the headlamp controlling module 32 which controls the operation of the headlamp 20. The headlamp controlling module 32 turns on the headlamp 20 when there is a turn-on request of the headlamp 20 (here, when the headlamp switch 12 is turned on). Moreover, the headlamp controlling module 32 switches an illuminating state of the headlamp 20 when there is a switching request of the illuminating state from the driver. The headlamp controlling module 32 constitutes a part of a module provided to the memory.

The headlamp controlling module 32 is able to adjust the light emitted forward of the vehicle by the headlamp 20, particularly in a brightness or luminance gradient which is a difference between the brightness of a part distant from the vehicle and the brightness of a part closer to the vehicle. The headlamp controlling module 32 adjusts the brightness gradient of the illuminating light of the headlamp 20 (hereinafter, simply referred to as the "brightness gradient of the headlamp 20") by adjusting the brightness of each of the plurality of LED light sources which constitute the headlamp 20. For example, the headlamp controlling module 32 adjusts the brightness gradient of the headlamp 20 by making the brightness of the LED light sources 23a of the low-beam unit 21 which illuminates the part near the vehicle among the LED light sources higher than the brightness of the LED light sources of the high-beam unit 22 which illuminates the part distant from the vehicle.

Here, as described above, when the road surface is wet at night or the vehicle enters into a tunnel during daytime, the visibility of the road state forward of the vehicle deteriorates. According to the present inventors' diligent research, it has been discovered that one of the causes of the visibility of the road state deteriorating is a reduction in the driver's visual recognition ability in these situations. In detail, when the road surface is wet at night, lights from stores and lights of the headlamps of the oncoming vehicle reflect on the water surface on the road and enters into the eyes of the driver. This contracts the pupils of the driver's eyes. When the driver's pupils become smaller, since an amount of light which enters into the pupils decreases, a dark spot forward of the vehicle becomes difficult to be seen, thereby worsening the driver's visual recognition ability. Moreover, since the pupils of the driver are smaller during the daytime, the driver's visual recognition ability worsens when the vehicle enters into a tunnel and the field of view becomes dark suddenly.

On the other hand, according to the present inventors' further research, it has been discovered that the driver's pupils are widened when the headlamp 20 adjusts the brightness gradient of the light emitted forward of the vehicle, and therefore, the driver's visual recognition ability improves. In detail, it has been discovered that the driver's visual recognition ability improves by making the brightness gradient of the headlamp 20 more than the normal gradient. This is described with reference to FIGS. 5 to 8.

Figure 5:
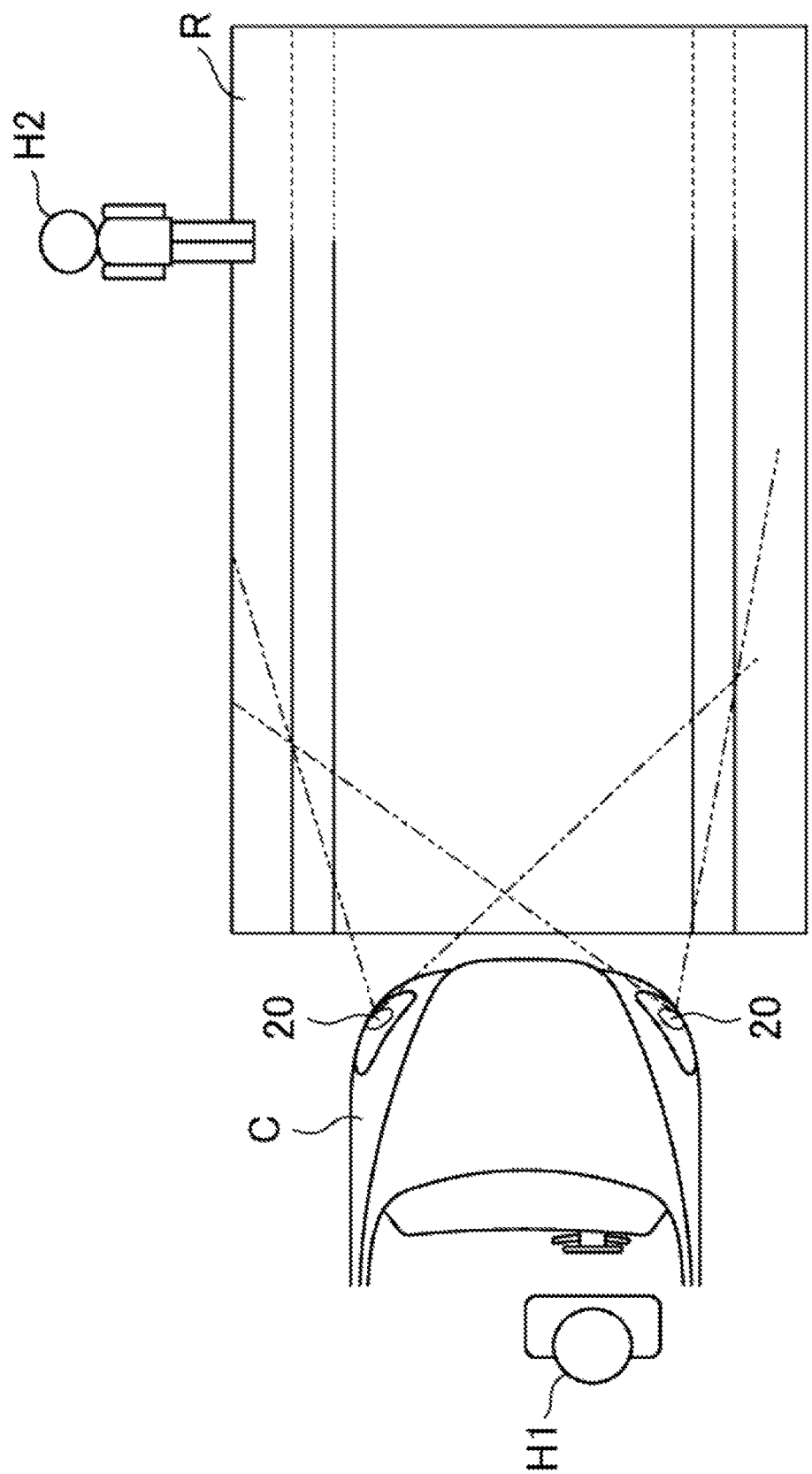
FIG. 5 is a view illustrating an experimental condition when a change in a visual recognition ability of a driver due to a brightness adjusting control is experimented.

FIG. 5 illustrates an experimental condition when experimenting a change in the driver's visual recognition ability due to the brightness adjusting control. A road R is a straight way and white lines are drawn outside in the vehicle width direction. The road R is to reproduce a road state during rainy or after snow cover by sprinkling water on the road surface. A subject H1 sits on the driver's seat of a vehicle C so that they can see the road R forward of the vehicle. The experiment is conducted in a state where lights are emitted forward from the headlamps 20 at night.

In the experiment, a pupil diameter of the subject H1 and a range of visibility of the subject H1 are measured. The observation of the pupil diameter is conducted by installing an in-vehicle camera which is capable of observing the pupil(s) of the subject H1 inside a cabin of the vehicle C, and calculating the pupil diameter based on the image captured by the in-vehicle camera. The range of visibility of the subject H1 is calculated by moving a measurer H2 forward along the white line of the road R, having the subject H1 give an instruction to the measurer H2 to stop at a location where the subject H1 cannot see the white line anymore, and measuring a distance from the location at which the measurer H2 stopped to the vehicle C. This measurement is carried out in a case (normal state) where the brightness gradient of the headlamp 20 is not adjusted and a case where the brightness gradient of the headlamp 20 is made larger than the normal state. The brightness gradient of the headlamp 20 is adjusted by increasing the brightness near the vehicle.

Figure 6:
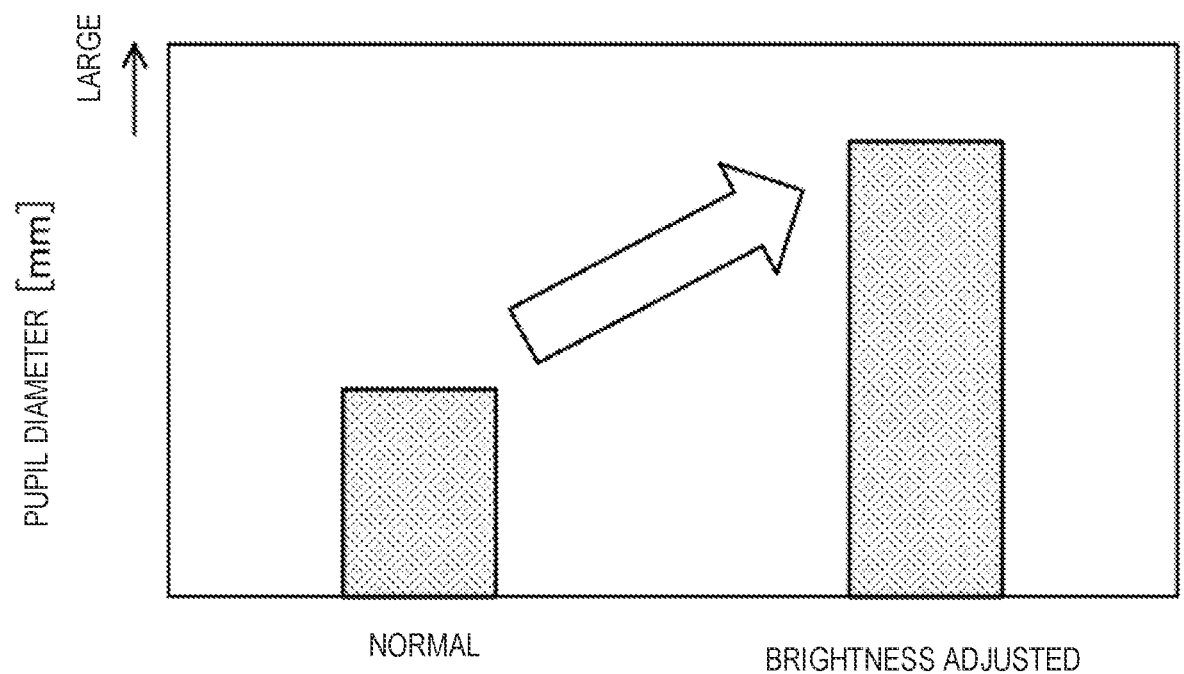
FIG. 6 is a graph illustrating a relationship between the existence of the brightness adjusting control and a pupil diameter of a subject.

FIG. 6 illustrates a graph in which the pupil diameters of the subject H1 are compared. Low brightness is the brightness gradient in a normal illuminating state of the headlamp 20, and high brightness is a state in which the brightness gradient is increased. As illustrated in FIG. 6, it can be seen that the pupil diameter of the subject H1 increases as the brightness gradient increases.

Figure 7:
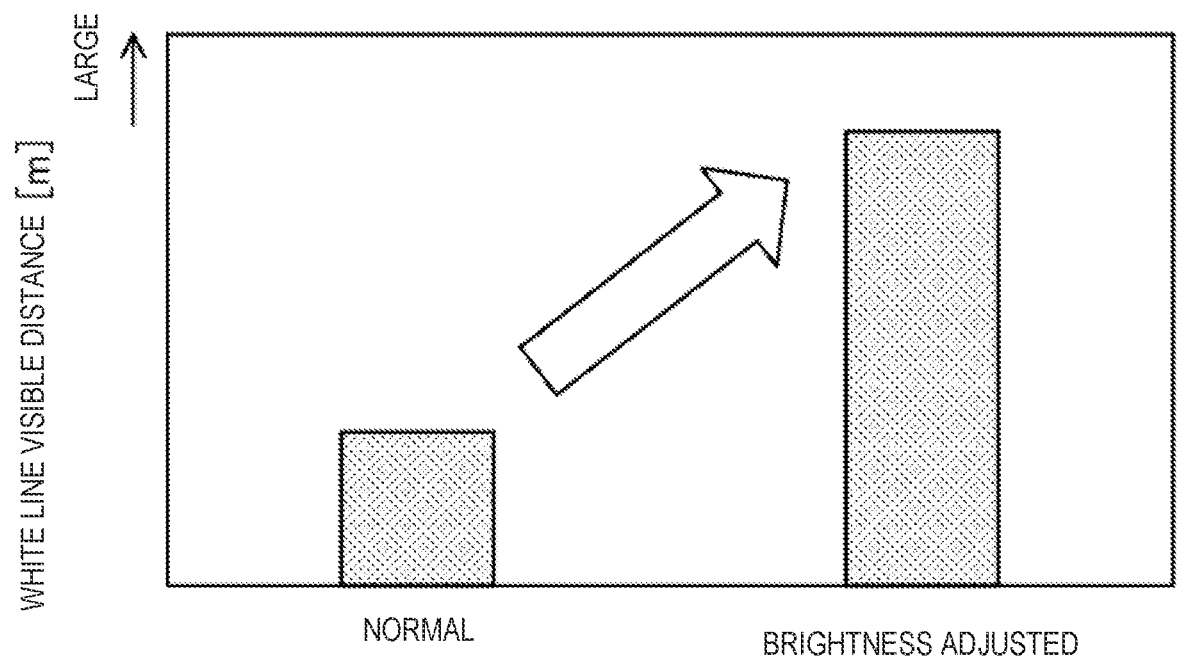
FIG. 7 is a graph illustrating a relationship between the existence of the brightness adjusting control and a distance of visibility of the subject.

Moreover, FIG. 7 illustrates a graph in which the distance of visibility of the subject H1 are compared. The low brightness is a brightness gradient in the normal illuminating state of the headlamp 20, and the high brightness is a state in which the brightness gradient is increased. As illustrated in FIG. 7, it can be seen that the range of visibility of the subject H1 becomes longer as the brightness gradient increases. This is because, when the pupil diameter of the subject H1 increases, the light entering into the pupils increases, and therefore, the subject H1 is in a state where they have a so-called "good night vision."

Thus, according to the present inventors' research, it has been discovered that the driver's visual recognition ability improves by adjusting the brightness gradient of the headlamp 20. Therefore, in Embodiment 1, when the traveling scene determining module 31 detects that the visibility of the road state forward of the vehicle deteriorates, the headlamp controlling module 32 executes a brightness adjusting control in which the brightness gradient of the headlamp 20 increases. In detail, the headlamp controlling module 32 increases, in the brightness adjusting control, the brightness gradient by making the brightness of the part closer to the vehicle higher than the brightness of the part distant from the vehicle in the light emitted from the headlamp 20. In more detail, the headlamp controlling module 32 increases, in the brightness adjusting control, the brightness gradient by making the brightness of each LED light source 23a of the low-beam unit 21 which illuminates the part closer to the vehicle higher, while maintaining the brightness of each LED light source of the high-beam unit 22 which illuminates the part distant from the vehicle.

In order to increase the brightness of the LED light sources 23a, a pulse width for activating the LED light sources 23a may be increased. Note that in the brightness adjusting control, the headlamp controlling module 32 may uniformly increase the brightness of each LED light source 23a of the low-beam unit 21 for illuminating the part closer to the vehicle, or may adjust the brightness of each LED light source 23a so that the brightness increases as the illuminating position becomes closer to the vehicle 1.

Figure 8:
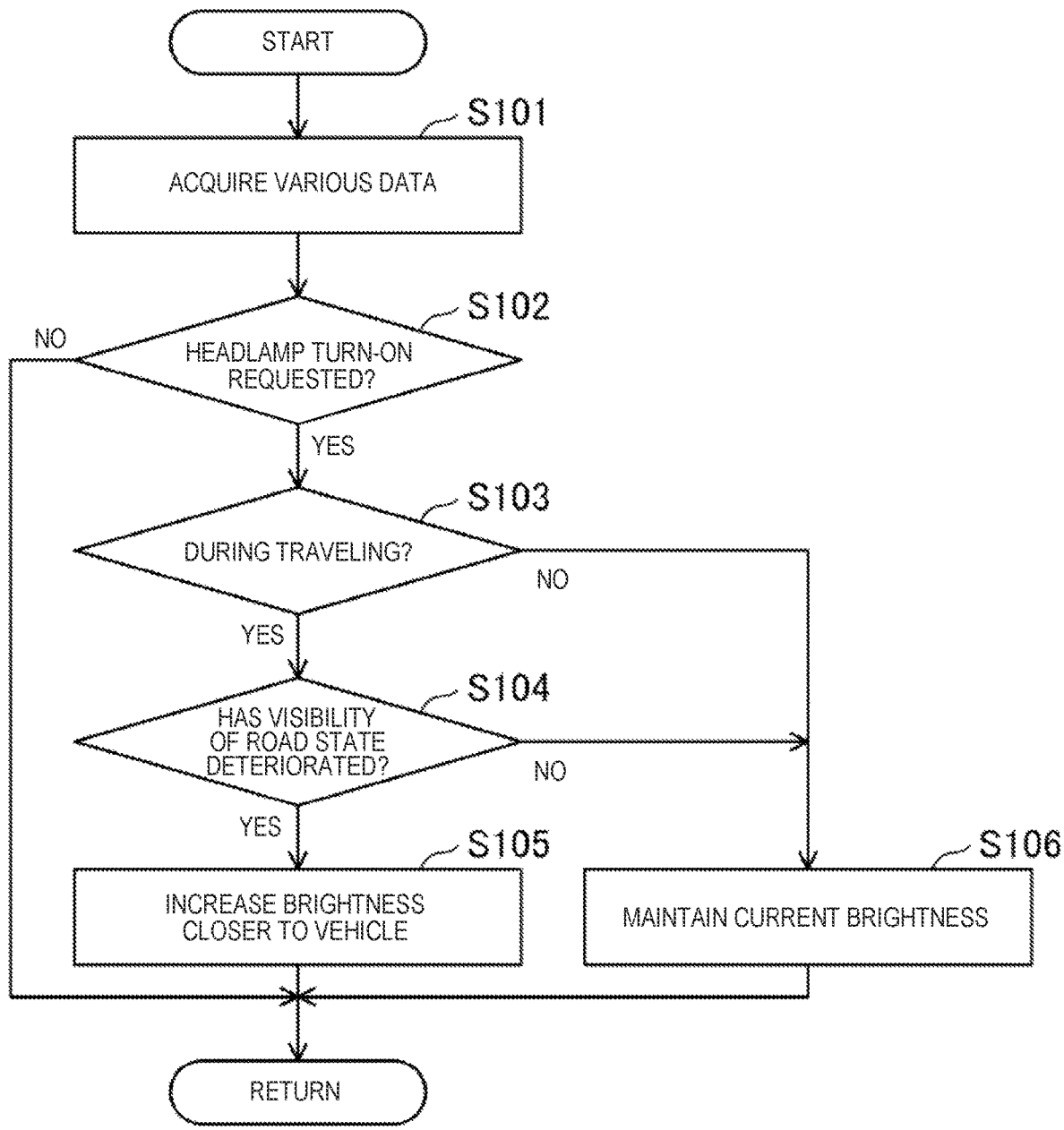
FIG. 8 is a flowchart illustrating a processing operation of the ECU when executing the brightness adjusting control.

Next, a processing operation of the ECU 30 when executing the brightness adjusting control is illustrated with reference to FIG. 8.

First, at Step S101, the ECU 30 acquires data from various sensors 11-13.

Next, at Step S102, the ECU 30 determines whether there is a turn-on request of the headlamp 20 from the driver. The ECU 30 determines whether there is the turn-on request of the headlamp 20 based on whether the headlamp switch 12 is in an ON state. If YES, where there is the turn-on request of the headlamp 20, the ECU 30 shifts to Step S103. On the other hand, if NO, where there is no turn-on request of the headlamp 20, the ECU 30 returns.

At Step S103, the ECU 30 determines whether the vehicle 1 is currently traveling. If the vehicle speed detected by the vehicle speed sensor 13 is faster than 0 km/h, the ECU 30 determines that the vehicle 1 is traveling. If YES, where the vehicle 1 is traveling, the ECU 30 shifts to Step S104. On the other hand, if NO, where the vehicle 1 is not traveling, the ECU 30 shifts to Step S106.

At Step S104, the ECU 30 determines whether the visibility of the road state forward of the vehicle has deteriorated. The ECU 30 determines whether the visibility of the road state has deteriorated by identifying the traveling scene based on the image captured by the vehicle external camera 11. If YES, where the visibility of the road state forward of the vehicle has deteriorated, the ECU 30 shifts to Step S105. On the other hand, if NO, where the visibility of the road state forward of the vehicle has not deteriorated, the ECU 30 shifts to Step S106.

At Step S105, the ECU 30 executes the brightness adjusting control to increase the brightness of the LED light source(s) 23a of the low-beam unit 21. Thus, the brightness gradient increases, and therefore, the driver's pupils are widened and the driver's visual recognition ability improves. Thereby, the visibility of the road state forward of the vehicle improves. The ECU 30 returns after Step S105.

At Step S106, the ECU 30 maintains the brightness of the headlamp 20 at the current brightness, without executing the brightness adjusting control. The ECU 30 returns after Step S106.

As described above, in Embodiment 1, the control device includes the vehicle external camera 11 and the traveling scene determining module 31 for detecting the visibility of the road state forward of the vehicle, and the headlamp controlling module 32 for controlling the brightness of the headlamp 20. The headlamp controlling module 32 is adjustable of the light emitted from the headlamp 20, particularly adjustable of the brightness gradient which is the difference between the brightness of the part distant from the vehicle and the brightness of the part closer to the vehicle. Further, when the deterioration in the visibility is detected by the traveling scene determining module 31, the headlamp controlling module 32 executes the brightness adjusting control in which the brightness gradient is increased as compared while the brightness gradient when the deterioration in the visibility is not detected. Therefore, when the deterioration in the visibility of the road state is detected, the driver's pupils can be made wider. As a result, the driver's visual recognition ability improves, and the visibility of the road state forward of the vehicle deteriorating can be suppressed.

In particular, in Embodiment 1, the headlamp controlling module 32 increases the brightness gradient in the brightness adjusting control, by increasing the brightness of the part closer to the vehicle, while the brightness of the part distant from the vehicle is maintained. Therefore, the location distant from the vehicle can be illuminated with sufficient brightness, while widening the driver's pupils. As a result, the driver's visual recognition ability is improved more effectively.

Moreover, in Embodiment 1, the headlamp 20 has the plurality of LED light sources, and the headlamp controlling module 32 increases the brightness gradient in the brightness adjusting control by adjusting the brightness of the plurality of LED light sources (particularly, the LED light sources 23a of the low-beam unit 21). The brightness gradient can easily be adjusted. As a result, the driver's visual recognition ability can easily be improved.

Embodiment 2

Hereinafter, Embodiment 2 is described in detail with reference to the accompanying drawings. Note that in the following description, the same reference characters are assigned to common parts to Embodiment 1 to omit the detailed description.

Figure 9:
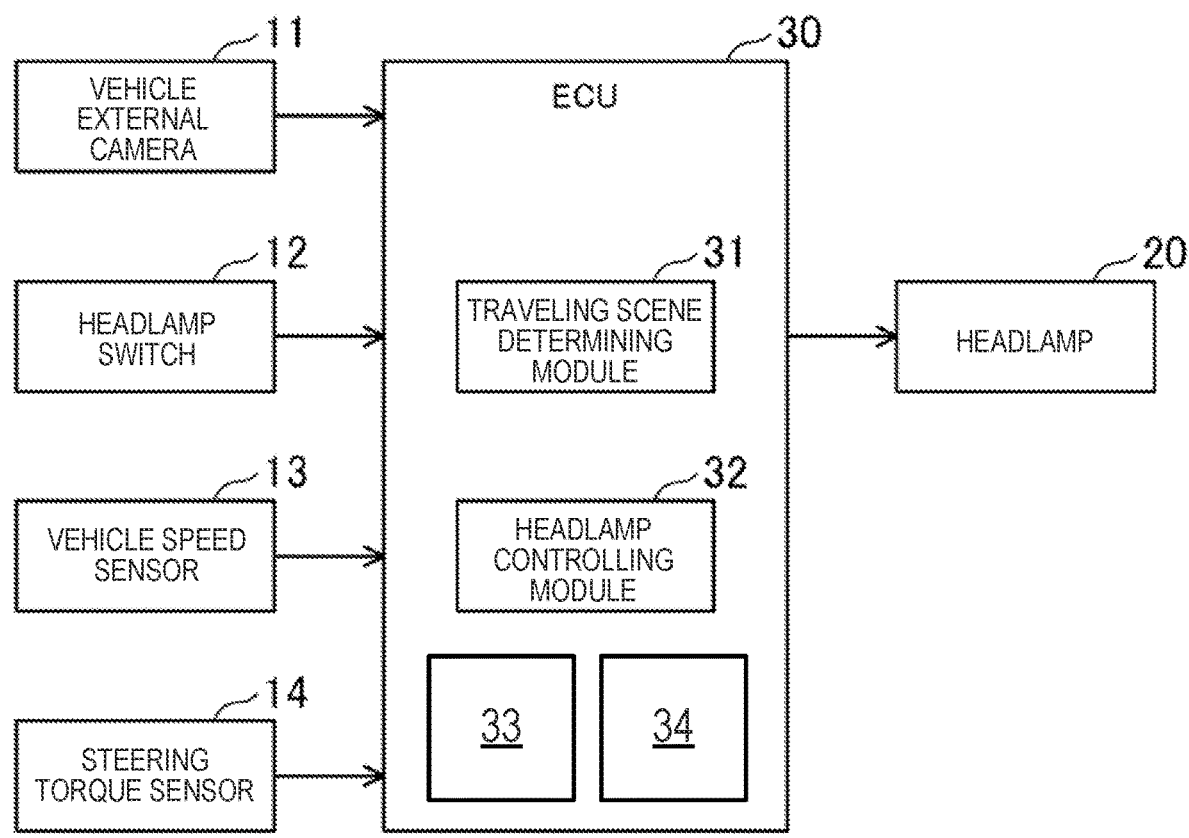
FIG. 9 is a block diagram illustrating a configuration of an ECU according to Embodiment 2.

As illustrated in FIG. 9, Embodiment 2 differs from Embodiment 1 in that a detected result of a steering torque sensor 14 is inputted into the ECU 30. Moreover, Embodiment 2 differs from Embodiment 1 in a condition for the headlamp controlling module 32 executing the brightness adjusting control. In detail, the headlamp controlling module 32 does not execute the brightness adjusting control, when the traveling scene determining module 31 determines that the vehicle 1 is turning to the right or to the left at an intersection. When the vehicle 1 turns to the right or turns to the left at the intersection, the driver needs to carefully watch the road state near the vehicle rather than the road state distant from the vehicle. If the brightness adjusting control is executed, as illustrated in FIG. 7, although a visually recognizable distance can be increased, its merit is small when it is necessary to carefully watch the road state near the vehicle. On the other hand, when the vehicle 1 goes straight at the intersection, since the driver needs to carefully watch the road state distant from the vehicle, they need to improve the driver's visual recognition ability by increasing the visually recognizable distance using the brightness adjusting control.

The traveling scene determining module 31 of the ECU 30 determines whether the vehicle 1 is located in an intersection based on the image captured by the vehicle external camera 11. The traveling scene determining module 31 determines whether the vehicle 1 is turning to the right or turning to the left based on the detected result of the steering torque sensor 14.

Figure 10:
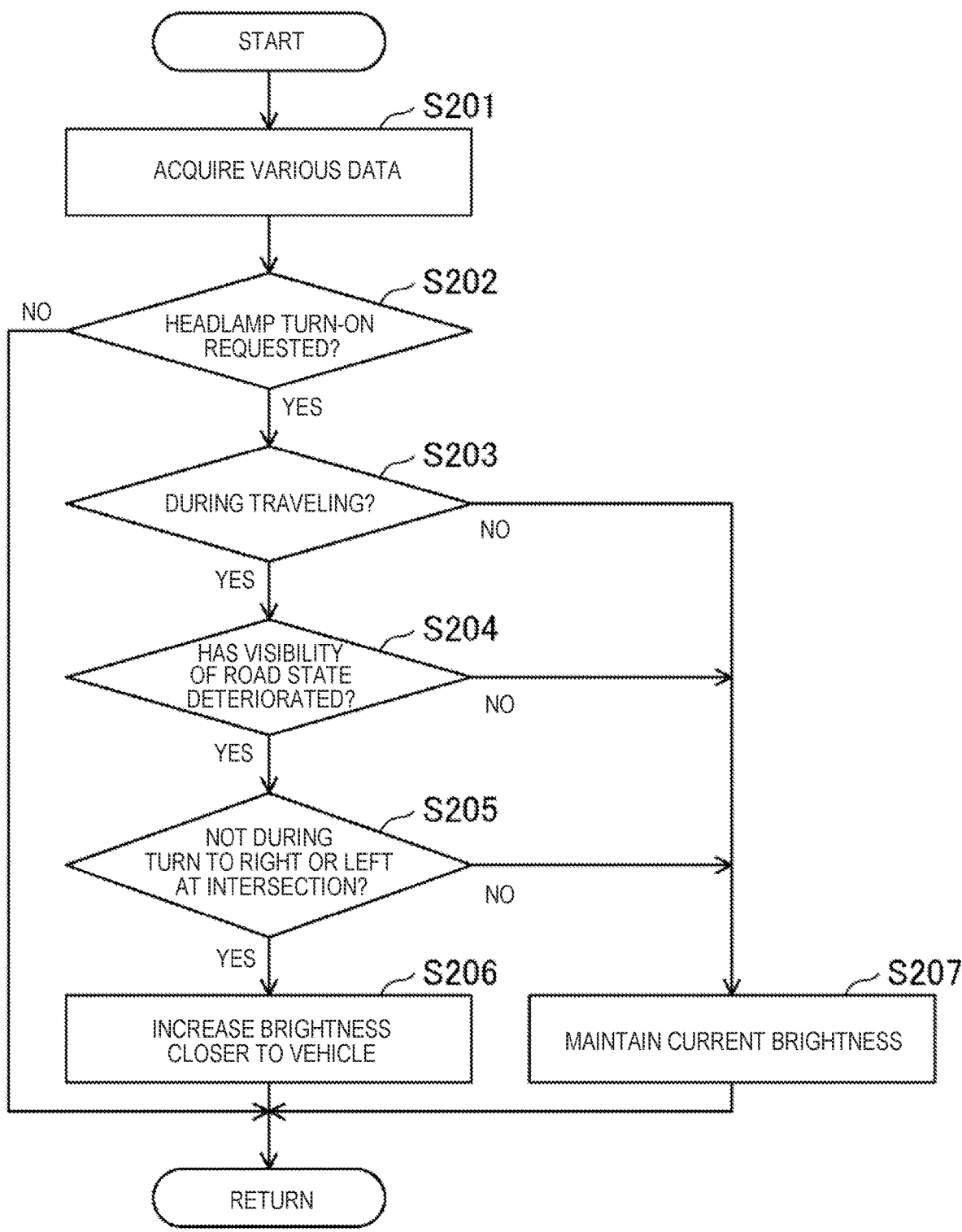
FIG. 10 is a flowchart illustrating a processing operation of a brightness adjusting control executed by the ECU according to Embodiment 2.

FIG. 10 is a flowchart when executing the brightness adjusting control by the ECU 30 according to Embodiment 2.

First, at Step S201, the ECU 30 acquires data from the various sensors 11-14.

Next, at Step S202, the ECU 30 determines whether there is a turn-on request of the headlamp 20 from the driver. If YES, where there is the turn-on request of the headlamp 20, the ECU 30 shifts to Step S203. On the other hand, if NO, where there is no turn-on request of the headlamp 20, the ECU 30 returns.

At Step S203, the ECU 30 determines whether the vehicle 1 is currently traveling. If YES, where the vehicle 1 is traveling, the ECU 30 shifts to Step S204. On the other hand, if NO, where the vehicle 1 is not traveling, the ECU 30 shifts to Step S207.

At Step S204, the ECU 30 determines whether the visibility of the road state forward of the vehicle has deteriorated. If YES, where the visibility of the road state forward of the vehicle has deteriorated, the ECU 30 shifts to Step S205. On the other hand, if NO, where the visibility of the road state forward of the vehicle has not deteriorated, the ECU 30 shifts to Step S207.

At Step S205, the ECU 30 determines whether the vehicle 1 is turning to the right or turning to the left at the intersection. The ECU 30 determines whether the vehicle 1 is turning to the right or turning to the left at the intersection based on the image captured by the vehicle external camera 11 and the detected result by the steering torque sensor 14. If YES, where the vehicle 1 is turning to the right or turning to the left at the intersection, the ECU 30 shifts to Step S206. On the other hand, if NO, where the vehicle 1 is neither turning to the right nor turning to the left at the intersection, the ECU 30 shifts to Step S207.

At Step S206, the ECU 30 executes the brightness adjusting control to increase the brightness of the LED light source(s) 23a of the low-beam unit 21. The ECU 30 returns after Step S206.

At Step S207, the ECU 30 maintains the brightness of the headlamp 20 at the current brightness, without executing the brightness adjusting control. The ECU 30 returns after Step S207.

Note that the brightness adjusting control is executed after the vehicle 1 finished the right turn or the left turn at the intersection.

Also with the configuration of Embodiment 2, the driver's recognition ability is improved and the visibility of the road state forward of the vehicle improves. Moreover, the power consumption of the battery 3 can be reduced.

Embodiment 3

Below, Embodiment 3 is described in detail with reference to the accompanying drawings. Note that in the following description, the same reference characters are assigned to common parts to Embodiments 1 and 2 to omit the detailed description.

Embodiment 3 differs from Embodiments 1 and 2 in a condition for the headlamp controlling module 32 executing the brightness adjusting control. In detail, when the traveling scene determining module 31 determines that an amount of environment light around the vehicle being more than a given amount, the headlamp controlling module 32 does not execute the brightness adjusting control. This is because, if there is much environment light around the vehicle, the driver's visual recognition ability hardly improves by the brightness adjusting control. That is, even if the brightness adjusting control is executed, the driver is hardly able to recognize the brightness gradient of the light of the headlamp 20, since the effect of the environment light is strong. In addition, if the brightness adjusting control is executed in such a scene where the improvement of the driver's visual recognition ability cannot be expected, the battery 3 will be depleted.

The traveling scene determining module 31 determines whether the environment light around the vehicle is more than the given amount based on the image captured by the vehicle external camera 11. Note that the given amount is desirably set to approximately the same brightness as an urban area with a large amount of light where many streetlights and stores around the road exist.

Figure 11:
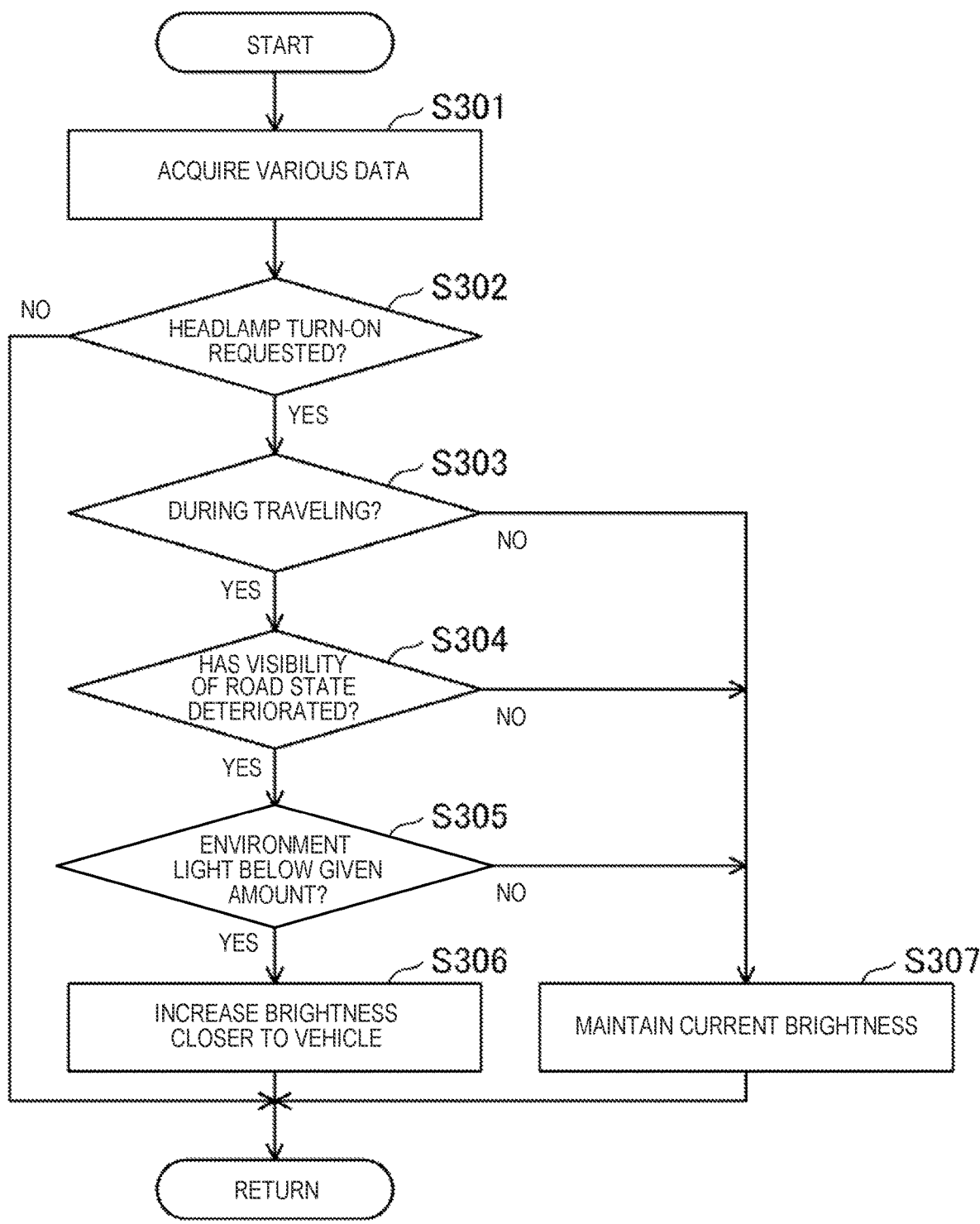
FIG. 11 is a flowchart illustrating a processing operation of a brightness adjusting control executed by an ECU according to Embodiment 3.

FIG. 11 is a flowchart when executing the brightness adjusting control by the ECU 30 according to Embodiment 3.

First, at Step S301, the ECU 30 acquires data from the various sensors 11-13.

Next, at Step S302, the ECU 30 determines whether there is a turn-on request of the headlamp 20 from the driver. If YES, where there is the turn-on request of the headlamp 20, the ECU 30 shifts to Step S303. On the other hand, if NO, where there is no turn-on request of the headlamp 20, the ECU 30 returns.

At Step S303, the ECU 30 determines whether the vehicle 1 is currently traveling. If YES, where the vehicle 1 is traveling, the ECU 30 shifts to Step S304. On the other hand, if NO, where the vehicle 1 is not traveling, the ECU 30 shifts to Step S307.

At Step S304, the ECU 30 determines whether the visibility of the road state forward of the vehicle has deteriorated. If YES, where the visibility of the road state forward of the vehicle has deteriorated, the ECU 30 shifts to Step S305. On the other hand, if NO, where the visibility of the road state forward of the vehicle has not deteriorated, the ECU 30 shifts to Step S307.

At Step S305, the ECU 30 determines whether the environment light around the vehicle is more than or below the given amount. The ECU 30 determines whether the environment light is below the given amount based on the image captured by the vehicle external camera 11. If YES, where the environment light around the vehicle is below the given amount, the ECU 30 shifts to Step S306. On the other hand, if NO, where the environment light around the vehicle is more than the given amount, the ECU 30 shifts to Step S307.

At Step S306, the ECU 30 executes the brightness adjusting control to increase the brightness of the LED light source(s) 23a of the low-beam unit 21. The ECU 30 returns after Step S306.

At Step S307, the ECU 30 maintains the brightness of the headlamp 20 at the current brightness, without executing the brightness adjusting control. The ECU 30 returns after Step S307.

Also with the configuration of Embodiment 3, the driver's recognition ability is improved and the visibility of the road state forward of the vehicle is improved. Moreover, the power consumption of the battery 3 can be reduced.

OTHER EMBODIMENTS

The technology disclosed herein is not limited to the above embodiments, and it can be substituted without departing from the scope of the appended claims.

For example, in Embodiments 1-3, the brightness gradient is adjusted by increasing the brightness of the LED light source(s) 23a of the low-beam unit 21. However, the brightness gradient may be adjusted by decreasing the brightness of the LED light source(s) of the high-beam unit 22. Alternatively, the brightness gradient may be adjusted by increasing the brightness of the LED light source(s) 23a of the low-beam unit 21, and decreasing the brightness of the LED light source(s) of the high-beam unit 22. Alternatively, the brightness gradient may be adjusted by changing the number of LED light sources which are turned on, without changing the brightness of each LED light source.

Moreover, in Embodiments 1-3, when the driver turns on the headlamp switch 12, it is determined that there is the headlamp turn-on request. However, it may be determined that there is the headlamp request when the traveling scene determining module 31 determines that the headlamps 20 need to be turned on (traveling at night or entering into a tunnel). Also with such an automatic turn-on type, the driver's visual recognition ability is improved by the brightness adjusting control as described above, and the visibility of the road state forward of the vehicle improves.

Moreover, in Embodiment 2, the traveling scene determining module 31 determines whether the vehicle 1 is located in an intersection based on the image captured by the vehicle external camera 11. However, the traveling scene determining module 31 may determine whether the vehicle 1 is located in an intersection based on map information and information from a global positioning system (GPS). Moreover, in Embodiment 2, the traveling scene determining module 31 determines the right turn and the left turn of the vehicle 1 based on the detected result of the steering torque sensor 14. However, the traveling scene determining module 31 may determine the right turn and left turn of the vehicle 1 based on an operating state of the blinker by the driver. Moreover, in Embodiment 2, the brightness adjusting control is executed, when the vehicle goes straight at an intersection. However, even when the vehicle goes straight at the intersection, the brightness adjusting control may not be executed, for example, until the vehicle passes through the intersection.

The above embodiments are merely an illustration and, therefore, the scope of the present disclosure is not to be interpreted restrictively. The scope of the present disclosure is defined by the appended claims, and all the modifications and changes belonging to the equivalents of the appended claims are encompassed by the present disclosure.

The technology disclosed herein is useful as a headlamp control device for controlling headlamps which illuminate forward of a vehicle.

DESCRIPTION OF REFERENCE CHARACTERS

1 Vehicle
11 Vehicle External Camera (Visibility Detector, Traveling Scene Detector, Environment Light Detector)
14 Steering Torque Sensor (Traveling Scene Detector)
20 Headlamp
23a LED Light Source
30 ECU
31 Traveling Scene Determining Module (Visibility Detector, Traveling Scene Detector, Environment Light Detector)
32 Headlamp Controlling Module

What is claimed is:

1. A headlamp control device configured to control a headlamp configured to illuminate forward of a vehicle, comprising:
   a camera configured to obtain an image; and
   a processor configured to:
      detect visibility of a road state forward of the vehicle from the image; and
      control a brightness of the headlamp,
   wherein the processor is configured to adjust light emitted from the headlamp so that a brightness gradient that is a difference in the brightness of a part distant from the vehicle and the brightness of a part closer to the vehicle is changed, and
   wherein, when a deterioration in the visibility is detected by the processor, the processor performs a brightness adjusting control in which the brightness gradient is increased by making the brightness of the part closer to the vehicle higher than the brightness of the part distant from the vehicle, as compared with the brightness gradient when the deterioration of the visibility is not detected.

2. The headlamp control device of claim 1, wherein the processor increases the brightness gradient in the brightness adjusting control by increasing the brightness of the part closer to the vehicle while the brightness of the part distant from the vehicle is maintained.

3. The headlamp control device of claim 2,
   wherein the processor is further configured to detect that the vehicle travels in an intersection, and
   wherein, when the processor detects that the vehicle turns to the right or turns to the left at the intersection, the processor does not perform the brightness adjusting control even when the deterioration in the visibility is detected.

4. The headlamp control device of claim 3,
   wherein the processor is further configured to detect an amount of environment light that is light around the vehicle from the image,
   wherein, when the environment light above a given threshold is detected, the processor does not perform the brightness adjusting control even when the deterioration in the visibility is detected.

5. The headlamp control device of claim 4,
   wherein the headlamp has a plurality of light-emitting diode (LED) light sources, and wherein the processor increases the brightness gradient in the brightness adjusting control by adjusting the brightness of each of the plurality of LED light sources.

6. The headlamp control device of claim 1,
wherein the processor is further configured to detect that the vehicle travels in an intersection, and
wherein, when the processor detects that the vehicle turns to the right or turns to the left at the intersection, the processor does not perform the brightness adjusting control even when the deterioration in the visibility is detected.

7. The headlamp control device of claim 1,
wherein the processor is further configured to detect an amount of environment light that is light around the vehicle from the image,
wherein, when the environment light above a given threshold is detected, the processor does not perform the brightness adjusting control even when the deterioration in the visibility is detected.

8. The headlamp control device of claim 1,
wherein the headlamp has a plurality of light-emitting diode (LED) light sources, and
wherein the processor increases the brightness gradient in the brightness adjusting control by adjusting the brightness of each of the plurality of LED light sources.

9. The headlamp control device of claim 2,
wherein the processor is further configured to detect an amount of environment light that is light around the vehicle from the image, and
wherein, when the environment light above a given threshold is detected, the processor does not perform the brightness adjusting control even when the deterioration in the visibility is detected.

10. The headlamp control device of claim 2,
wherein the headlamp has a plurality of light-emitting diode (LED) light sources, and
wherein the processor increases the brightness gradient in the brightness adjusting control by adjusting the brightness of each of the plurality of LED light sources.

11. The headlamp control device of claim 3,
wherein the headlamp has a plurality of light-emitting diode (LED) light sources, and
wherein the processor increases the brightness gradient in the brightness adjusting control by adjusting the brightness of each of the plurality of LED light sources.

12. The headlamp control device of claim 6,
wherein the headlamp has a plurality of light-emitting diode (LED) light sources, and
wherein the processor increases the brightness gradient in the brightness adjusting control by adjusting the brightness of each of the plurality of LED light sources.

13. The headlamp control device of claim 7,
wherein the headlamp has a plurality of light-emitting diode (LED) light sources, and
wherein the processor increases the brightness gradient in the brightness adjusting control by adjusting the brightness of each of the plurality of LED light sources.

14. The headlamp control device of claim 9,
wherein the headlamp has a plurality of light-emitting diode (LED) light sources, and
wherein the processor increases the brightness gradient in the brightness adjusting control by adjusting the brightness of each of the plurality of LED light sources.

15. The headlamp control device of claim 1,
wherein the headlamp includes a low-beam unit and a high-beam unit,
wherein the low-beam unit forms light directed to a lower location forward of the vehicle than the high-beam unit, and
wherein the part distant from the vehicle is a location where the light of the high-beam unit is directed, and the part closer to the vehicle is a location where the light of the low-beam unit is directed.

16. The headlamp control device of claim 5,
wherein the headlamp includes a low-beam unit and a high-beam unit,
wherein the low-beam unit forms light directed to a lower location forward of the vehicle than the high-beam unit, and
wherein the part distant from the vehicle is a location where the light of the high-beam unit is directed, and the part closer to the vehicle is a location where the light of the low-beam unit is directed.

17. The headlamp control device of claim 5, wherein the processor adjusts the brightness gradient of the headlamp by making the brightness of the plurality of LED light sources of a low-beam unit configured to illuminate the part closer to the vehicle higher than the brightness of the plurality of LED light sources of a high-beam unit configured to illuminate the part distant from the vehicle.

18. The headlamp control device of claim 8, wherein the processor adjusts the brightness gradient of the headlamp by making the brightness of the plurality of LED light sources of a low-beam unit configured to illuminate the part closer to the vehicle higher than the brightness of the plurality of LED light sources of a high-beam unit configured to illuminate the part distant from the vehicle.

19. The headlamp control device of claim 10, wherein the processor adjusts the brightness gradient of the headlamp by making the brightness of the plurality of LED light sources of a low-beam unit configured to illuminate the part closer to the vehicle higher than the brightness of the plurality of LED light sources of a high-beam unit configured to illuminate the part distant from the vehicle.

20. The headlamp control device of claim 11, wherein the processor adjusts the brightness gradient of the headlamp by making the brightness of the plurality of LED light sources of a low-beam unit configured to illuminate the part closer to the vehicle higher than the brightness of the plurality of LED light sources of a high-beam unit configured to illuminate the part distant from the vehicle.

* * * * *